I. A. WALLQUIST.
DRAINING ATTACHMENT FOR DISH PANS.
APPLICATION FILED JULY 13, 1910.
982,908.
Patented Jan. 31, 1911.
2 SHEETS—SHEET 1.
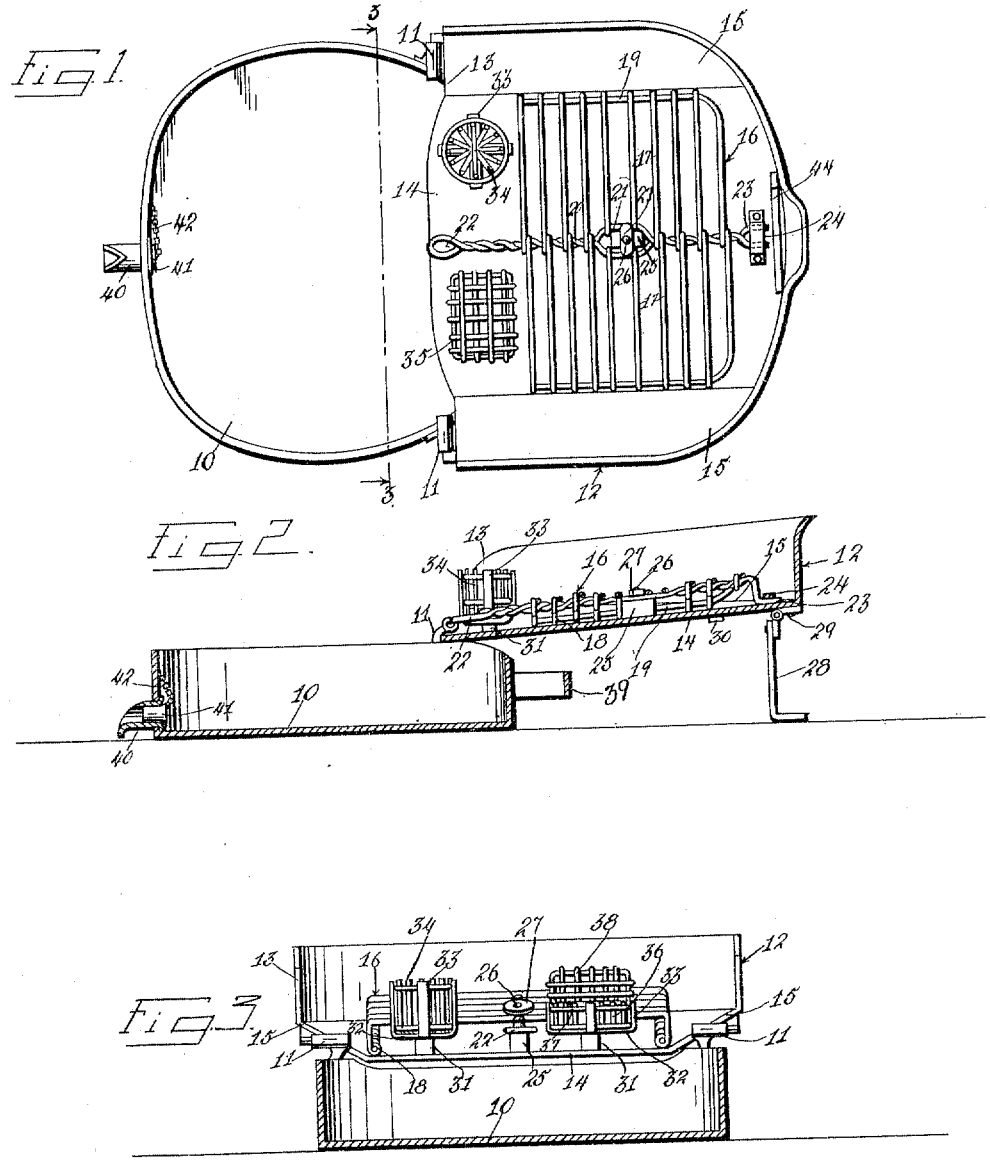
Witnesses
Inventor
IDA A. WALLQUIST
Attorneys.

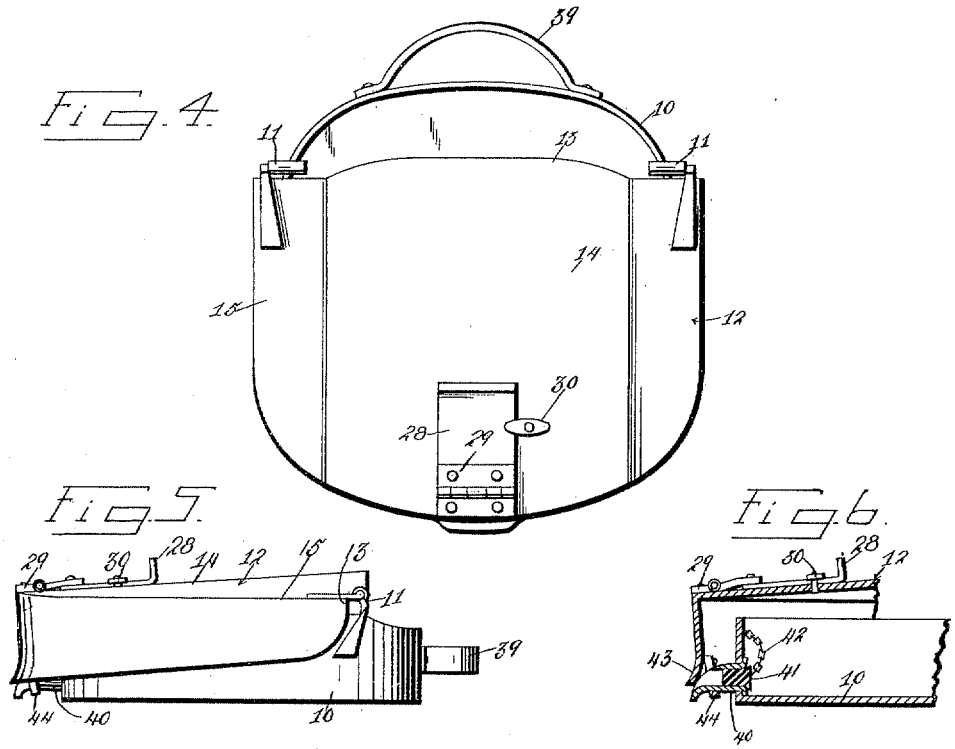
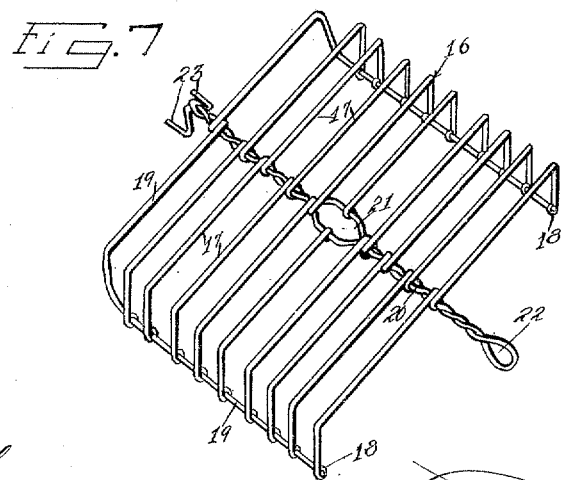

UNITED STATES PATENT OFFICE.

IDA A. WALLQUIST, OF BUCKLIN, MISSOURI.

DRAINING ATTACHMENT FOR DISH-PANS.

982,908.  Specification of Letters Patent.  Patented Jan. 31, 1911.

Application filed July 13, 1910. Serial No. 571,784.

*To all whom it may concern:*

Be it known that I, IDA A. WALLQUIST, a citizen of the United States, residing at Bucklin, in the county of Linn, State of Missouri, have invented certain new and useful Improvements in Draining Attachments for Dish-Pans; and I do hereby declare the following to be a full, clear, and exact description of the invention, such as will enable others skilled in the art to which it appertains to make and use the same.

This invention relates to draining attachments for dish pans and has for its object to provide a device of this character in which the drainer and dish pan fit one into the other so that the device may be stored in a minimum amount of space.

A further object is to provide a device of this character having a dish rack that may be removed and used as a broiler when desired.

A further object is to provide a device of this character having novel spring clasps for removably securing a knife holder and soap tray.

In the accompanying drawings forming part of this specification:—Figure 1 is a plan view of my improved device showing the parts in open position. Fig. 2 is a longitudinal sectional view through the device in open position. Fig. 3 is a cross sectional view taken on the line 3—3, Fig. 1. Fig. 4 is a bottom plan view of the device in folded position. Fig. 5 is a side elevation of the pan in folded position. Fig. 6 is a fragmentary sectional view of the dish pan showing the method of locking the parts together. Fig 7 is a detail perspective view of the dish rack.

Referring now to the drawing, 10 designates a dish pan which may be formed of any desired material and of any desired shape, the preferable shape being shown in the drawing.

Hingedly mounted at 11 upon the rim of the dish pan is a draining pan 12, which is open at one end as shown at 13 to permit of the draining pan being folded over the dish pan so as to occupy a minimum amount of space. It may be said that the draining pan embraces the dish pan since when the parts are folded together, the pans are one within the other, both occupying but a little more space than either separably occupies.

The bottom 14 of the draining pan is provided adjacent its opposite sides with inclined portions 15, these portions facilitating the drainage of water that may splash toward the sides of the pan through the open end of the pan and into the dish pan.

Arranged within the draining pan is a dish rack 16 comprising a plurality of spaced parallel wires 17 the terminals of which are bent downwardly and formed with eyes 18 which encircle a U shaped base wire 19 which is designed to rest upon the pan and support the wires 17 of the rack in parallelism with the bottom of the pan.

Arranged transversely and centrally of the wire 19 is a stranded wire 20 about which the intermediate portions of the wire 17 are looped, this stranded wire having a centrally located eye 21 for securing the rack in position as will presently be described. The strand wire terminates at one end in a handle 22, by means of which the rack may be removed from the draining pan and used as a broiler when necessary. The stranded wire terminates remote from the handle in a pair of forwardly extending lips 23 which are engaged beneath an arched strap 24 fixed to the pan bottom when the rack is being used as a dish draining rack. It is evident that dishes of various sizes may be inserted between the various wires on either side of the centrally located stranded wire for draining.

For removably securing the rack within the draining pan, a post 25 is fixed to the bottom of the pan and is provided with an upstanding reduced extremity 26 upon which a button 27 is swiveled, this button bearing with its extremities against the sides of the eye 21 formed in the stranded wire of the dish rack in operative position and retaining the dish rack against accidental displacement.

As above stated, the draining pan folds over the dish pan when in closed position and when in open position, the draining pan inclines rearwardly from the dish pan and for holding the draining pan so that its bottom will slope gently toward the dish pan, a foot 28 is hinged at 29 adjacent the outer edge of the bottom of the draining pan. This foot collapses against the bottom of the draining pan and is locked in collapsed position by a button 30 which turns over the foot, as clearly shown in Fig. 4.

Mounted upon the bottom of the draining pan adjacent its open end is a pair of spaced posts 31, these posts being equipped at their upper ends with radial spring arms 32, the terminals 33 of which are upturned. A knife and fork holder 34 is arranged in a vertical position between the upturned terminals of the spring arms of one of the posts, this knife and fork holder being formed of a plurality of spaced parallel wires connected together adjacent their top and bottom edges by circles of wire as shown. Knives and forks equipped with ivory handles may be placed in this holder face downward so that the handles are kept from contact with the water in the bottom of the draining pan. A soap and Sapolio tray 35 is arranged between the upturned spring arms of the other post, this tray being formed of a plurality of spaced parallel wires bent to form substantially U shaped bars 36 which are connected together at their intermediate portions by rectangular loops of wire 37, this tray being divided into two compartments and being equipped with a hinged lid 38, as shown in Fig. 3 wherein the lid is shown in open position. The knife and fork holder and tray may be readily removed and inserted from between the spring arms of the post when desired for scouring. The spring arms of the posts are sufficiently stiff to prevent accidental displacement of the knife and fork holder and tray when the pan is closed.

Fixed to the dish pan is a strap 39 which performs the function of a handle for manipulating the pan and also for suspending the pan from a convenient nail when not in use.

Fixed in the side wall of the dish pan remote from the handle is a spout 40, the stopper 41 being secured by a flexible connector 42 to the side walls of the pan and being adapted to close the mouth of the spout when the pan is full of water.

It will be noted that the leading end of the dish pan when the draining pan is folded thereover is spaced considerably from the leading end of the draining pan, which latter engages with its free end the free end of the spout as shown at 43, and prevents injury to the spout. A hook 44 is hinged to the leading wall of the draining pan and is adapted to be hooked over the spout when the draining pan is folded over the dish pan, as clearly shown in Fig. 6, whereby to securely lock the pans against accidental opening.

What is claimed is:—

1. A device of the class described comprising a dish pan, a draining pan hinged thereto and having one end thereof open, the rim of one of said pans being adapted, when the device is folded, to embrace the rim of the other pan.

2. The combination with a dish pan, of a draining pan hingedly mounted upon the rim of the dish pan and having an open end to permit of the dish pan being folded into the draining pan, the bottom of said draining pan having portions raised above the normal plane of the bottom forming oppositely disposed inclines, a rack supported between said inclines, and interlocking means between the rack and the draining pan.

In testimony whereof, I affix my signature, in presence of two witnesses.

IDA A. WALLQUIST.

Witnesses:
C. E. ROUSE,
ESTHER HOLMLUND.